United States Patent [19]

Brewer et al.

[11] Patent Number: 4,766,844
[45] Date of Patent: Aug. 30, 1988

[54] ROBOTIC TINNING STATION FOR AXIAL LEAD ELECTRONIC COMPONENTS

[75] Inventors: Troy D. Brewer, Forest Hill; Thorner S. Defibaugh, Jr., Westminster, both of Md.

[73] Assignee: Westinghouse Electric Corp., Pittsburgh, Pa.

[21] Appl. No.: 55,495

[22] Filed: May 28, 1987

[51] Int. Cl.$^4$ ............................................. B05C 11/00
[52] U.S. Cl. ..................................... 118/668; 118/74; 118/406; 118/425; 118/503; 427/123; 901/6; 901/31; 198/425; 198/533; 414/741; 228/47
[58] Field of Search ...................... 901/6, 31; 198/425, 198/533; 228/47; 414/741; 118/425, 426, 429, 503, 504, 668, 697, 406, 74; 427/123, 405

[56] References Cited

U.S. PATENT DOCUMENTS

| | | | |
|---|---|---|---|
| 2,506,047 | 5/1950 | Thomas | 118/504 X |
| 2,776,640 | 1/1957 | Miklofsky et al. | 118/74 |
| 2,814,268 | 11/1957 | Korbitz | 118/425 X |
| 2,935,962 | 5/1960 | Deitrick et al. | 118/74 |
| 2,964,007 | 12/1960 | Buffington | 118/406 X |
| 3,056,371 | 10/1962 | Frank | 118/409 X |
| 3,180,551 | 4/1965 | Richard et al. | 228/47 |
| 3,182,813 | 5/1965 | Goodell et al. | 901/6 X |
| 3,765,591 | 10/1973 | Cook | 118/63 X |
| 3,893,409 | 7/1975 | Rote | 118/74 X |
| 3,931,879 | 1/1976 | Javerlat et al. | 198/425 X |
| 3,941,242 | 3/1976 | Braden | 198/533 X |
| 3,995,588 | 12/1976 | Booz et al. | 118/426 |
| 4,298,118 | 10/1981 | Cottrell | 198/503 X |
| 4,304,324 | 12/1981 | Huggins | 198/425 X |
| 4,336,926 | 6/1982 | Inagaki et al. | 414/741 X |
| 4,491,084 | 1/1985 | Marshall, Jr. | 118/74 X |
| 4,573,727 | 3/1986 | Iikura | 901/31 X |
| 4,674,946 | 6/1987 | Crawford | 901/31 X |
| 4,685,415 | 8/1987 | Wegner | 118/503 |

Primary Examiner—Shrive P. Beck
Assistant Examiner—Alain Bashore
Attorney, Agent, or Firm—R. P. Lenart

[57] ABSTRACT

A tinning station for axial lead electronic components includes a presentation system for arranging a plurality of axial lead components in an elevated linear array with adjacent components lying parallel to each other. A pair of grippers, have a pair of parallel bars each having a longitudinal slot and a length at least as long as the length of the component array. These bars are moved toward or away from each other by an actuator which is mounted on a robotic arm. This arm is programmed to position the grippers adjacent to the array so that the actuator can cause the grippers to clamp the ends of the bodies of the components in the array. Then the arm dips the leads on each side of the array into the solder flux and subsequently into molten solder, thereby tinning the leads. The thickness of the grippers defines an untinned length of each component lead. A release fixture is used to dislodge any components which do not fall from the grippers when the grippers are separated.

8 Claims, 5 Drawing Sheets

ROBOTIC TINNING STATION FOR AXIAL LEAD ELECTRONIC COMPONENTS

BACKGROUND OF THE INVENTION

This invention relates to the tinning of leads on electronic components and, more particularly, to a system for automatically tinning the leads of axial lead electronic components.

In order to improve the solderability of the leads of electronic components, it is desirable to deposit a thin layer of solder on the component leads prior to the insertion of the components in an electronic circuit. The process of forming this thin layer of solder is generally referred to as tinning and is typically manually performed by an operator who first dips the component leads into solder flux and then dips the leads into a molten pool of solder. This process is not only tedious and time-consuming but it also presents certain safety hazards by exposing the operator to solder flux and molten solder. It is therefore desirable to devise an automated tinning system which would enhance operator safety while reducing the time required to complete the process for a given number of components.

SUMMARY OF THE INVENTION

A tinning station constructed in accordance with the present invention is particularly adapted to tinning the leads of axial lead electronic components and includes a presentation system for arranging a plurality of axial lead components in an elevated linear array. Each of the components includes a body with an axis and a pair of leads extending from opposite sides of the body along the axis. In the array, axes of adjacent components lie generally parallel to each other. A pair of grippers, each including a bar having a length at least as long as the linear array of components, are provided to grasp the array. The gripper bars are generally parallel to each other and may be moved toward and away from each other by an actuator which is mounted on a robotic arm. A longitudinal slot in each gripper bar accepts the component leads and allows the grippers to close on the ends of the component bodies. Devices are provided which contain a pool of solder flux and a pool of solder. The robotic arm is programmed to maneuver and actuate the grippers such that they pick up the component array from the presentation block, dip the leads of the array in the solder flux and subsequently dip the leads of the array in the molten solder. The thickness of the gripper bars can be varied to vary the length of an untinned portion of the component leads adjacent to the component bodies.

When using a tinning station in accordance with the present invention, an operator need only load the axial lead components onto a presentation block, or into a feed hopper, and can thereby maintain a safe distance from the flux and molten solder.

DESCRIPTION OF THE PREFERRED EMBODIMENT

Figure 1:
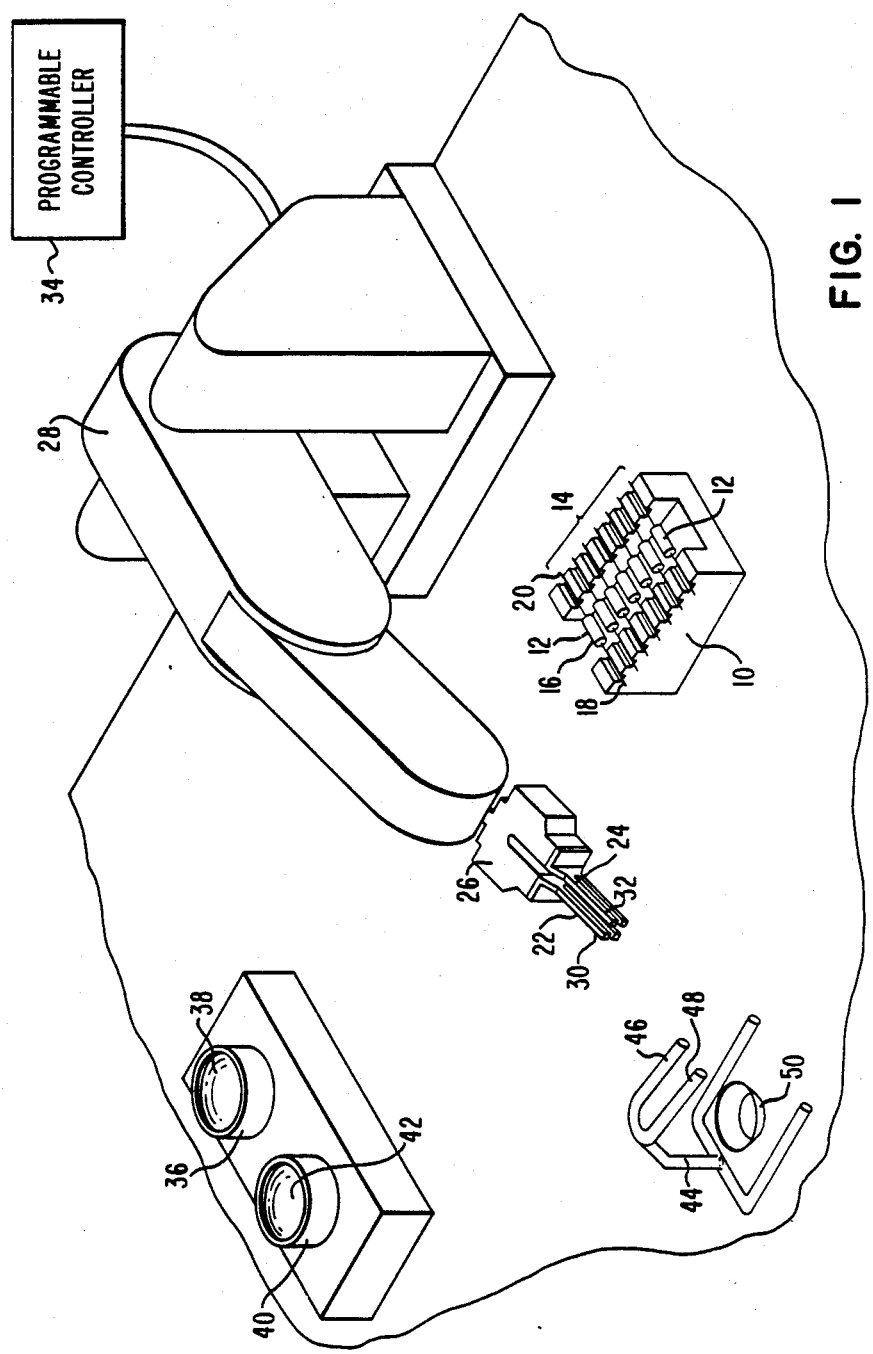
FIG. 1 is a schematic representation of a tinning station constructed in accordance with one embodiment of the present invention.

Referring to the drawings, FIG. 1 is a schematic representation of a tinning station constructed in accordance with one embodiment of the present invention. This station includes a presentation system in the form of a block 10 for arranging a plurality of axial lead electronic components 12 in a linear array 14. Each of the components includes a body 16 having an axis and a pair of leads 18 and 20 which extend from opposite sides of the body along the axis. When arranged in the linear array, the axes of adjacent components lie generally parallel to each other. A pair of grippers 22 and 24 are mounted on an actuator 26 which is in turn mounted on a robotic arm 28. The grippers include bars 30 and 32 which lie generally parallel to each other and can be moved toward or away from each other by the actuator 26. A programmable controller 34 is used to control the operation of the robotic arm and actuator.

A flux pot 36 contains a pool of liquid solder flux 38 having a generally horizontal surface. A solder pot 40 contains a pool of molten solder 42 also having a generally horizontal surface. A release bar 44 is provided with a pair of spaced tines 46 and 48 which serve to dislodge components from the grippers following the tinning operation thereby causing the components to fall into cup 50.

To perform the tinning function, an operator first places several axial lead components in the presentation block 10. The robotic arm then slides the grippers along the array of components and the actuator closes the gripper bars to secure the component array between the grippers. The grippers are moved inward to secure the component bodies between the grippers. In one embodiment of the invention, up to seven components can be processed at one time. Then the robotic arm moves the grasped array of components to the vicinity of the solder pot. The array is rotated 90° and the leads on one side of the array are dipped into and out of the flux. The array is then flipped and the leads on the other side of the array are dipped into and out of the flux. Next, the array is transported to a heated solder pot and the leads on one side of the array are dipped into the molten solder (at 500°±20° F.) for approximately four seconds. The array is slowly lifted vertically out of the molten solder and rotated 180°. The other leads of the array are subsequently dipped into the molten solder for four seconds. The robotic arm slowly lifts these component leads vertically out of the molten solder and transports the component array to an unloading station. Here the grippers pass under a pair of tines on the release bar 44 and, with the grippers open, the grippers are pulled vertically between the tines and the parts are unloaded into cup 50. Then the robotic arm moves the grippers to the presentation block to pick up the next array of axial lead components.

The robotic arm, programmable controller and actuator may be any available robotic arm system which is capable of moving and operating the grippers in the necessary manner. For example, a tinning station constructed in accordance with the present invention has used an Alpha II, robotic arm, available from Microbot, Inc., Mountain View, Calif.

Figure 2C:
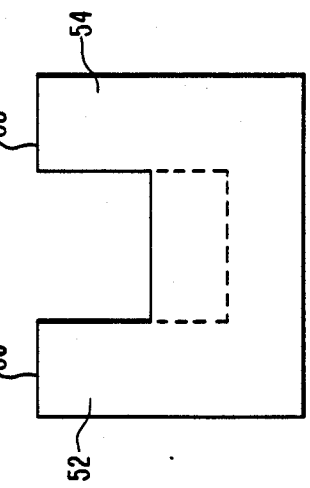
FIGS. 2A, 2B and 2C are top, side and end views, respectively, of the presentation block used in the system of FIG. 1.
Figure 2A:
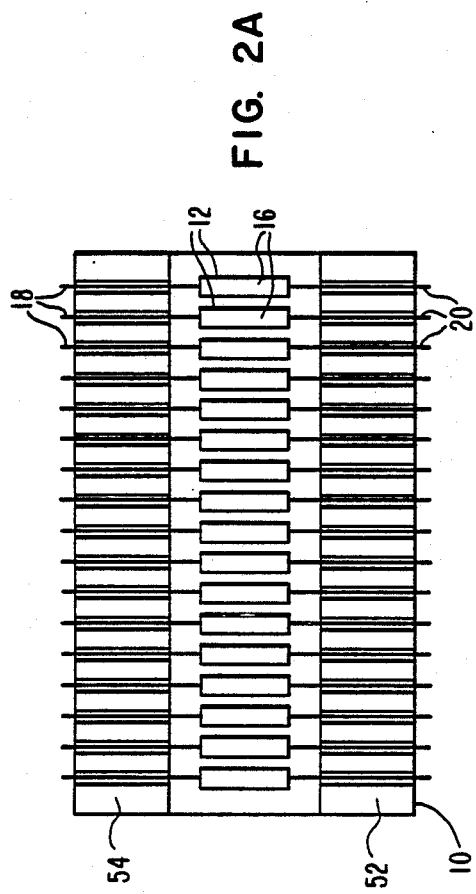
Figure 2B:
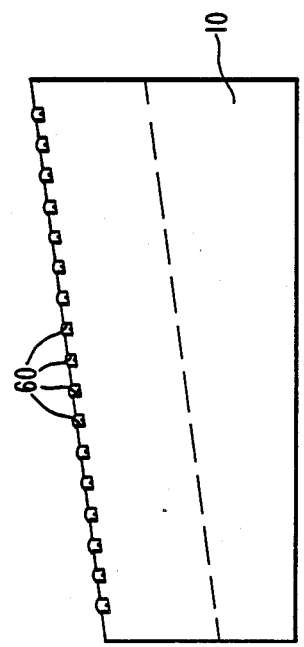

FIGS. 2A, 2B and 2C are top, side and end views of the presentation block 10 in the system of FIG. 1. This block includes a pair of generally vertical sides 52 and 54 having sloping top surfaces 56 and 58. A plurality of notches 60 are cut into these top surfaces and are positioned to receive the axial leads 18 and 20 which extend from the bodies 16 of the axial lead components 12. Corresponding notches are cut in surfaces 56 and 58 and the notches are spaced to prevent contact between the bodies of adjacent components.

Figure 3A:
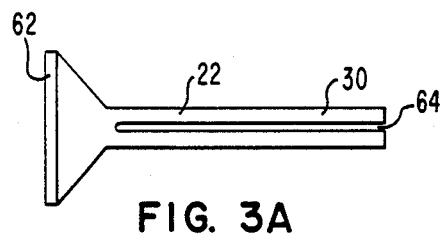
FIGS. 3A and 3B are top and side views, respectively, of one of the grippers used in the tinning system of FIG. 1.
Figure 3B:
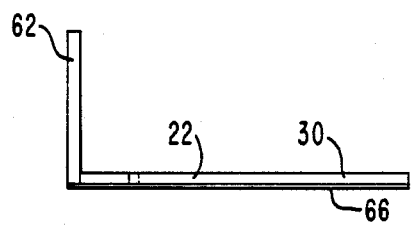

FIGS. 3A and 3B are top and side views of one of the grippers used in the system of FIG. 1. Since the grippers of FIG. 1 are identical, only one is illustrated in FIGS. 3A and 3B. That gripper is an L-shaped piece that includes a first end 62 which is attached to the robotic arm actuator and a bar 30 having a length which is at least as long as the length of the array of electronic components to be tinned. The bar 30 includes a slot 64 which receives the leads of the axial lead components. A layer of resilient material 66 may be attached to one side of the bar 30 to prevent slippage of the axial lead components when they are clamped between grippers. Two layers of masking tape have been shown to function adequately as this resilient layer, for a limited time. The grippers may be constructed from a material which does not readily adhere to solder, such as stainless steel or aluminum.

Figure 4A:
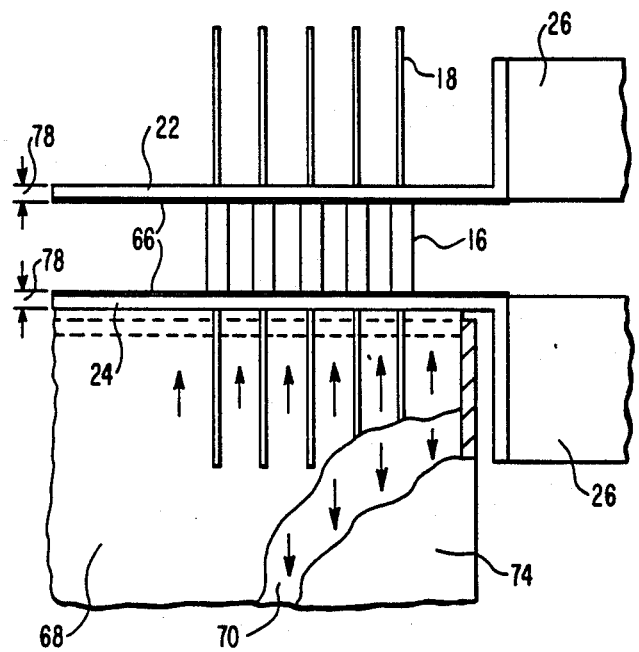
FIGS. 4A and 4B are side and end views, partially in section, of an alternative embodiment of the solder containing device of the system of FIG. 1.
Figure 4B:
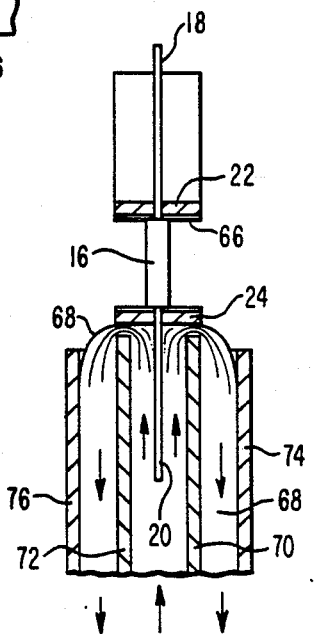

FIGS. 4A and 4B illustrate an alternative soldering device which may be used in the system of FIG. 1. This device is a solder fountain wherein molten solder 68 flows as illustrated by the arrows, up a central spout between walls 70 and 72 and back down between walls 74 and 76. in FIGS. 4A and 4B, the grippers 22 and 24 were inserted in a direction perpendicular to the component leads and positioned adjacent to opposite ends of the component body 16 such that the component leads 18 and 20 extend through the slots in the grippers and the grippers are clamped against opposite sides of the bodies. In this clamping arrangement, the thickness 78 of the grippers is used to define an untinned portion of the component leads adjacent to the component bodies. In certain applications, specifications require that the tinned portion of the leads must be spaced from the component body by a particular distance, for example, one-sixteenth of an inch. In these instances, grippers having bars with the appropriate thickness can be fabricated to prevent tinning along the desired length of the leads which lies adjacent to the component bodies. Of course, the solder fountain (or solder pot in FIG. 1) must be high enough to provide clearance for the actuator 26, thereby permitting the positioning of the bottom gripper adjacent to the top of the molten solder.

Figure 5A:
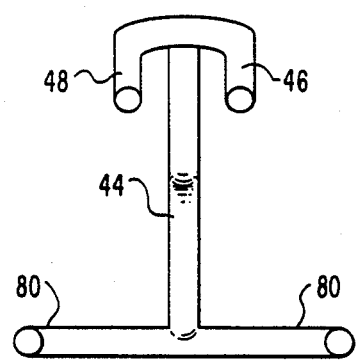
FIGS. 5A, 5B and 5C are end, side and top views, respectively, of the release bar of the station of FIG. 1.
Figure 5B:
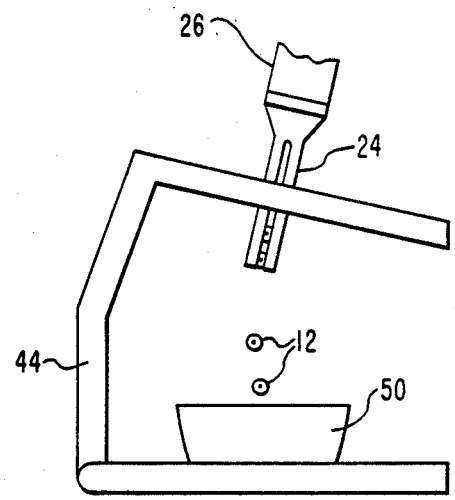
Figure 5C:
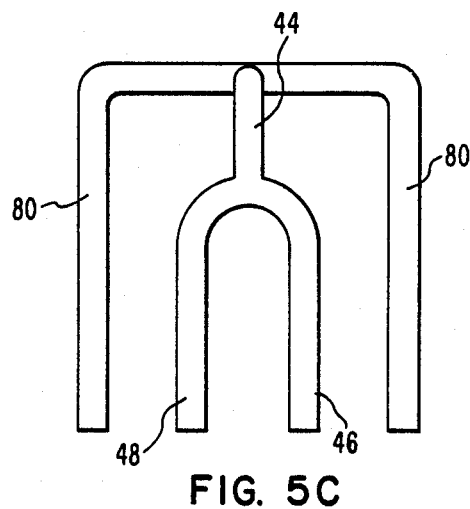

FIGS. 5A, 5B and 5C represent end, side and top views of the release fixture of the station of FIG. 1. This fixture includes a pair of tines 46 and 48 which are spaced far enough apart for the grippers to pass vertically between them. For the case where the gripper hold the sides of the components as illustrated in FIG. 5B, the distance between the tines should be larger than the length of the bodies of the components so that only the component leads touch the tines as the grippers are pulled vertically between them. The base 80 of the release fixture is configured to accept the cup 50.

Figure 6:
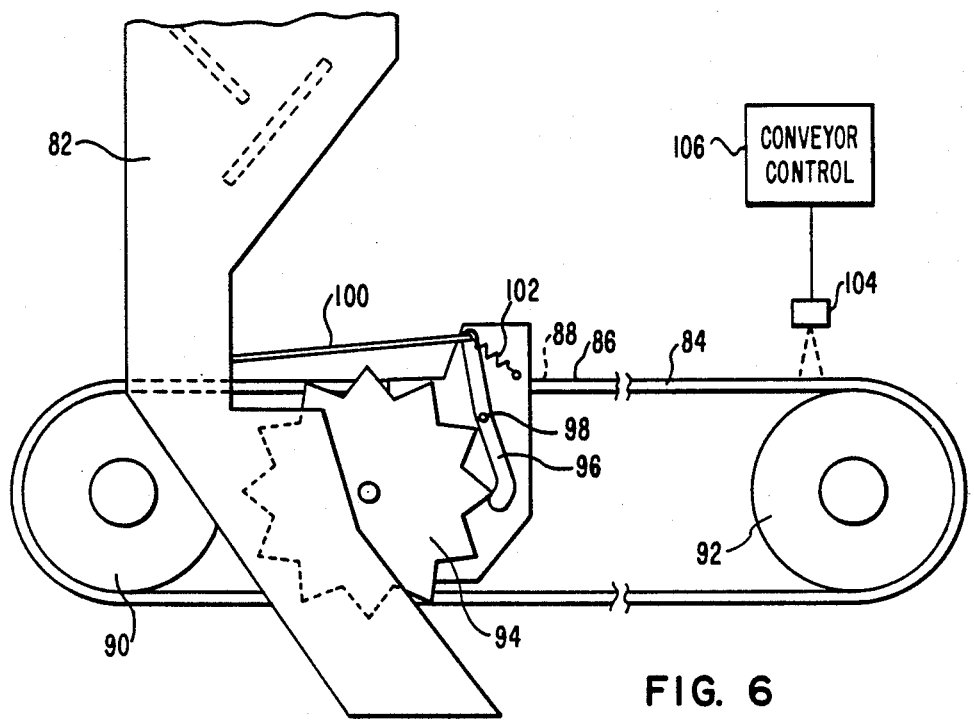
FIGS. 6 and 7 are schematic representations of portions of an alternative presentation system.
Figure 7:
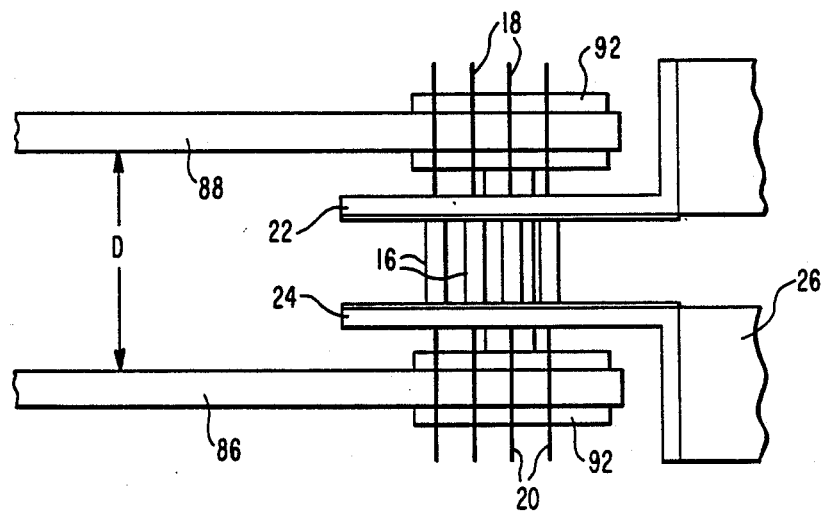

FIGS. 6 and 7 are schematic representations of portions of an alternative component presentation system to be used in the present invention. In this presentation system, components to be tinned are loaded into a zigzag hopper 82 which is positioned adjacent to a conveyor system 84. The conveyor system includes a pair of belts 86 and 88 which are mounted on a pair of pulleys 90 and 92. A star wheel 94 is mechanically coupled to the conveyor to turn as the conveyor belts move thereby causing pivot arm 96 to pivot about pivot pin 98 causing reciprocal movement of actuating arm 100. A spring 102 maintains contact between the pivot arm and the star wheel. Reciprocal movement of the actuating arm 100 actuates the component deposition mechanism within the commercially available zig-zag feed hopper thereby depositing components on the conveyor belts 86 and 88. These components are positioned generally parallel to each other as illustrated in FIG. 7. As the components reach the end of the conveyor, a sensor (such as an electric eye 104) detects the presence of these components and sends a signal to the conveyor control 106 thereby turning off the conveyor. Then the robotic grippers 22 and 24 extend between the conveyor belts and close onto a plurality of components to be tinned.

This presentation system eliminates the need for an operator to manually load a presentation block each time the robot arm is cycled. Once the robot arm removes a preselected number of components from the conveyor, the sensor indicates that components are not present near the end of the conveyor and the conveyor control is signalled to restart the conveyor thereby causing additional components to be deposited on the conveyor belts. It should be noted that the distance D between conveyor belts 86 and 88 must be sufficient to accommodate not only the component bodies 16 but also the grippers 22 and 24 with sufficient additional clearance to permit the grippers to be inserted on opposite sides of the component bodies.

Although the present invention has been described in terms of what is at present believed to be its preferred embodiment, it will be apparent to those skilled in the art that various changes may be made to the system without departing from the scope of the invention. It is therefore intended that the appended claims cover such changes.

What is claimed is:

1. A tinning station for axial lead components comprising:

a presentation system for arranging a plurality of axial lead components in an elevated linear array with each of said components having a body with an axis and a pair of leads extending from opposite sides of said body along said axis, wherein axes of adjacent components lie generally parallel to each other;

a pair of grippers, each including a bar having a longitudinal slot and having a length at least as long as said linear array of components;

said gripper bars lying generally parallel to each other;

an actuator for moving said gripper bars toward or away from each other in a direction substantially parallel to said axes, thereby enabling said gripper bars to clamp opposite ends of each of said component bodies in said linear array of components, wherein each of said component leads extends through one of said slots in said grippers;

a flux pot for containing a pool of liquid solder flux;

means for producing a generally horizontal layer of molten solder; and a robotic arm for supporting and moving said actuator and said grippers, such that said leads extending from each side of said array of axial lead components, which is clamped between said gripper bars, are first dipped in said flux and then dipped in said solder to tin each end of said leads.

2. A tinning station as recited in claim 1, wherein said means for producing a generally horizontal layer of molten solder comprises:

a solder pot having a height sufficient to prevent bottoming of said actuator when said actuator is positioned adjacent to one side of said solder pot and one of said gripper bars lies adjacent to said horizontal layer of molten solder.

3. A tinning station as recited in claim 1, further comprising:

a release fixture for dislodging tinned components from said grippers, said release fixture including two tines being spaced apart by a distance greater than the length of said component bodies but smaller than the length of each of said component bodies plus the leads extending axially therefrom.

4. A tinning station as recited in claim 1, wherein:

the thickness of said gripper bars defines a length of untinned lead adjacent to each component body.

5. A tinning station as recited in claim 1, further comprising:

a pair of layers of resilient material attached to confronting surfaces of said gripper bars.

6. A tinning station as recited in claim 1, wherein said presentation system comprises:

a block having a pair of generally parallel, vertical sides, said sides being spaced apart by a distance which is longer than the length of said component bodies but shorter than the combined length of each of said component bodies, plus the leads extending axially therefrom; and a plurality of notches in a top surface of each of said sides, for receiving said axial leads.

7. A tinning station as recited in claim 1, wherein said means for producing a generally horizontal layer of molten solder comprises:

a solder fountain having a height sufficient to prevent bottoming of said actuator when said actuator is positioned adjacent to one side of said fountain and one of said gripper bars lies adjacent to said horizontal layer of molten solder.

8. A tinning station as recited in claim 1, wherein said presentation system comprises:

a conveyor having a pair of spaced belts;

means for placing said plurality of axial lead components across said belts with said component bodies positioned between said belts; and means for controlling the operation of said conveyor to stop movement of said belts when said components have reached a predetermined location.

* * * * *